United States Patent
Berggren et al.

(10) Patent No.: US 8,830,708 B2
(45) Date of Patent: Sep. 9, 2014

(54) FAULT CURRENT LIMITATION IN DC POWER TRANSMISSION SYSTEMS

(75) Inventors: Bertil Berggren, Västerås (SE); Staffan Norrga, Stockholm (SE); Tomas U. Jonsson, Västerås (SE)

(73) Assignee: ABB Research Ltd., Zürich (CH)

(*) Notice: Subject to any disclaimer, the term of this patent is extended or adjusted under 35 U.S.C. 154(b) by 81 days.

(21) Appl. No.: 13/395,359

(22) PCT Filed: Sep. 11, 2009

(86) PCT No.: PCT/EP2009/061815
§ 371 (c)(1),
(2), (4) Date: Apr. 3, 2012

(87) PCT Pub. No.: WO2011/029480
PCT Pub. Date: Mar. 17, 2011

(65) Prior Publication Data
US 2012/0201059 A1    Aug. 9, 2012

(51) Int. Cl.
*H02H 7/26* (2006.01)
*H02J 3/36* (2006.01)
*H02M 7/483* (2007.01)
*H02M 1/32* (2007.01)

(52) U.S. Cl.
CPC *H02J 3/36* (2013.01); *H02H 7/268* (2013.01); *H02M 2007/4835* (2013.01); *Y02E 60/60* (2013.01); *H02M 1/32* (2013.01)
USPC .......................................................... 363/51

(58) Field of Classification Search
USPC .................... 363/51, 52, 53, 54, 128, 129
See application file for complete search history.

(56) References Cited

U.S. PATENT DOCUMENTS

| | | | | |
|---|---|---|---|---|
| 4,156,896 A | * | 5/1979 | Weiss | 363/87 |
| 4,598,195 A | * | 7/1986 | Matsuo | 219/497 |
| 4,879,639 A | * | 11/1989 | Tsukahara | 363/37 |

(Continued)

FOREIGN PATENT DOCUMENTS

| | | |
|---|---|---|
| JP | 4-138063 A | 5/1992 |
| JP | 11-27853 A | 1/1999 |
| WO | WO 01/24342 A1 | 4/2001 |

(Continued)

OTHER PUBLICATIONS

Luo et al., "A Novel Solid State Fault Current Limiter for DC Power Distribution", IEEE, 2008, pp. 1284-1289.

*Primary Examiner* — Gary L Laxton
*Assistant Examiner* — Trinh Dang
(74) *Attorney, Agent, or Firm* — Birch, Stewart, Kolasch & Birch, LLP

(57) ABSTRACT

A method, voltage source converter and computer program product for limiting the current in a DC power transmission system are disclosed. The voltage source converter has an AC side and a DC side and a fault current path between these sides. It furthermore includes a control unit and at least one switching unit of a first type provided in the fault current path and that includes a primary switching element together with an anti-parallel secondary controllable rectifying element. Based on a fault being detected in the DC power system when the primary switching elements of the converter are blocked, the control unit changes the control of the controllable rectifying element from acting as a non-controllable rectifying to acting as a controllable rectifying element.

29 Claims, 6 Drawing Sheets

(56) References Cited

U.S. PATENT DOCUMENTS

| | | |
|---|---|---|
| 6,624,993 B1 | 9/2003 | Boenig et al. |
| 2002/0024828 A1* | 2/2002 | Hayashi et al. ............... 363/35 |
| 2006/0133120 A1* | 6/2006 | Sato et al. .................... 363/37 |
| 2010/0066174 A1 | 3/2010 | Dommaschk et al. |
| 2010/0085785 A1* | 4/2010 | Dommaschk et al. .......... 363/54 |

FOREIGN PATENT DOCUMENTS

| | | |
|---|---|---|
| WO | WO 02/093726 A1 | 11/2002 |
| WO | WO 2008/067786 A1 | 6/2008 |

* cited by examiner

FAULT CURRENT LIMITATION IN DC POWER TRANSMISSION SYSTEMS

FIELD OF INVENTION

The present invention generally relates to voltage source converters. More particularly the present invention relates to a method, voltage source converter and computer program product for limiting the current in a DC power transmission system.

BACKGROUND

Direct Current (DC) power transmission systems are of interest to use in various situations, for instance when transferring electrical power over long distances.

It is here possible to provide a DC power transmission system as a grid being connected to one or more Alternating Current (AC) systems or AC grids via one or more voltage source converters.

A DC system can here be connected to an AC system in several different ways. It is for instance possible that the DC system is connected via one voltage source converter and a transformer such that there is no grounding on the DC side. It is also possible to connect a DC system to an AC system using separate voltage source converters connected on the DC side between a positive DC potential and ground and a negative DC potential and ground, respectively. In the first case a fault current from the AC side occurs when there are pole-to-pole faults, while in the second case a fault current from the AC side occurs when there are pole-to-ground faults. The first case may also result in fault current at a pole-to-ground fault if the transformer is grounded on both sides or if no transformer is used. One problem with large DC grids is related to selective disconnection of faulty components. If there is for instance a "large" bipolar DC grid, then if a pole-to-ground fault occurs, the voltages on this pole will be severely depressed everywhere in the grid due to the low resistance in the DC grid as compared to the network impedances in a corresponding AC grid. As a consequence essentially no power can be transmitted on this pole as long as the fault is not disconnected. In order to minimize impact on surrounding AC grids and connected end-users, it is important to quickly disconnect the fault. Furthermore, in order to have as much power transfer capability available in the period following the fault, it is important to only disconnect the faulty piece of equipment. These problems will also exist at pole-to-pole faults.

However, it is difficult to break large DC currents, which may be necessary when removing faults in DC power transmission systems. This problem is furthermore getting more severe the more voltage source converters are connected to such a DC power transmission system. There is therefore a need for improvement on this situation.

One way to simplify removal of the fault, which removal may thus involve a breaking of a connection in the DC power transmission system, is through reducing the fault current.

Limiting of the DC current can be performed in a number of ways.

JP 11027853 does for instance describe a rectifier connected to a DC power line including a diode. The rectifier is made up of thyristors. The diode is used to measure the current through the DC power line and the thyristors are controlled to limit this current.

In "A Novel Solid State Fault Current Limiter for DC Power Distribution", Applied Power Electronics Conference and Exposition, APEC 2008 by Luo, et al a Fault Current Limiter is described. The Fault Current Limiter is provided in series with a DC power line and includes a thyristor in parallel with a transistor, such as an Insulated Gate Bipolar Transistor (IGBT). There is also a capacitor. In operation the thyristor is turned off and the transistor is turned on at the occurrence of a fault. This causes a current running through the transistor and capacitor to gradually increase and the current running through the thyristor to gradually decrease to zero for dependably turning off the thyristor. Once the thyristor has been dependably turned off, the transistor is turned on and off for controlling the fault current.

JP 04138063 describes a bridge type rectifier circuit having thyristors in one leg and switches in another leg.

U.S. Pat. No. 6,624,993 describes a fault current limiting system for direct current circuits. Here a diode is provided in series with a transmission line. If a fault current exceeds a current from a current source that biases the diode open, the diode will cease to conduct and route a fault current through the current source and an inductor.

However, it would be of interest to reduce the fault current using a voltage source converter. A voltage source converter is a converter that is based on switching units, where a switching unit is a combination of a primary switching element with an anti-parallel secondary rectifying element.

SUMMARY OF THE INVENTION

The present invention is directed towards reducing fault currents by means of control of switching units in voltage source converters.

One object of the present invention is to provide a method for limiting the fault current in a DC power transmission network, which uses the switching units of a voltage source converter.

This object is according to a first aspect of the present invention achieved through a method for limiting the current in a DC power transmission system using a voltage source converter including a fault current path between an AC side and a DC side of the converter, the fault current path including at least one switching unit of a first type, where each switching unit of the first type includes a primary switching element together with an anti-parallel secondary controllable rectifying element, the method comprising the steps of:

blocking primary switching elements of the converter,
detecting a fault in the DC power system,
changing the control of the controllable rectifying elements in the fault current path from a first control mode to a second control mode, the first control mode being to control the controllable rectifying elements to act as non-controllable rectifying elements and the second control mode being to control the controllable rectifying elements to act as controllable rectifying elements, and
controlling, according to the second control mode, the controllable rectifying elements of the fault current path to limit the current at the DC side of the converter.

Another object of the present invention is to provide a voltage source converter for limiting the fault current in a DC power transmission network, which converter uses its own switching units for this fault current limitation.

This object is according to a second aspect of the present invention achieved through a voltage source converter for limiting the current in a DC power transmission system, being provided with an AC side and a DC side and having a fault current path between the AC side and the DC side, the voltage source converter comprising:

at least one switching unit of a first type provided in the fault current path, where each switching unit of the first type includes a primary switching element together with an anti-parallel secondary controllable rectifying element, and a control unit configured to, based on a fault being detected in the DC power system when the primary switching elements of the converter are blocked, change the control of the controllable rectifying elements from a first control mode to a second control mode, the first control mode being to control the controllable rectifying elements to act as non-controllable rectifying elements and the second control mode being to control the controllable rectifying elements to act as controllable rectifying elements, and control, according to the second control mode, the controllable rectifying elements of the fault current path to limit the current at the DC side of the converter.

Another object of the present invention is to provide a computer program product for limiting the fault current in a DC power transmission network, which uses the switching units of a voltage source converter for the fault current limitation.

This object is according to a third aspect of the present invention achieved through computer program product for limiting the current in a DC power transmission system using a voltage source converter including a fault current path between an AC side and a DC side of the converter, the fault current path including at least one switching unit of a first type, where each switching unit of the first type includes a primary switching element together with an anti-parallel secondary controllable rectifying element. The computer program is loadable into a control unit of the voltage source converter and comprising computer program code means to make the control unit, when the program is loaded in the control unit, change, based on a fault being detected in the DC power transmission system when the primary switching elements of the converter are blocked, the control of the controllable rectifying elements from a first control mode to a second control mode, the first control mode being to control the controllable rectifying elements to act as non-controllable rectifying elements and the second control mode being to control the controllable rectifying elements to act as controllable rectifying elements, and control, according to the second control mode, the controllable rectifying elements of the fault current path to limit the current at the DC side of the converter.

The present invention has a number of advantages. It limits the fault current in a DC power transmission system, which simplifies the removal of the fault. This allows a simpler and more economical realization of circuit breakers to be made. As the current limitation is made in the secondary rectifying elements of the voltage source converter, there is no additional current limitation element provided in the DC power transmission system. This allows current limitation to be provided without significantly limiting the efficiency of the DC power transmission system in normal operation. This also provides current limiting functionality without additional elements, but the same voltage source converter elements can be used for voltage conversion and current limitation.

The controlling of the controllable rectifying elements according to the second control mode may involve controlling the elements with a pre-determined control signal. It may also be based on detecting the current at the DC side of the converter and control of the controllable rectifying elements of the fault current path based on this detected current.

The controlling of the controllable rectifying elements of the fault current path according to the second control mode may comprise controlling of the average current at the DC side of the converter to a set current limitation value.

The detection of a fault in the DC power system may involve comparing at least one characteristic of at least one power component at the DC side of the voltage source converter with at least one power component threshold and determining that there is a fault in case the characteristic of the power component passes this threshold. A power component may here be the voltage and a characteristic may be the level of this voltage while the corresponding power component threshold may be a first voltage level reference. The determining that there is a fault is in this case made in dependence of if the voltage falls below the first voltage level reference. For this power component another characteristic used may be the rate of change and the corresponding power component threshold would then be a voltage rate of change threshold. The determining that there is a fault is in this case made in dependence of if the rate of change of the voltage falls below this voltage rate of change threshold. Another power component may be the current and a characteristic may be the level of this current, where a corresponding power component threshold is a current level threshold. The determining that there is a fault is in this case made in dependence of if the current rises above this current level threshold. Another characteristic that may be used also for this power component is the rate of change of the current, where the corresponding threshold is a current rate of change threshold. The determining that there is a fault is in this case made in dependence of if the rate of change of the current rises above this current rate of change threshold.

According to the invention it is also possible to detect the removal of the fault and resume control of the controllable rectifying elements of the fault current path according to the first control mode based on the detection of the removal of the fault. The detection of the removal of the fault may comprise comparing the average voltage at the DC side with a second voltage reference and determining that the fault has been removed in case this average voltage rises above the second voltage reference.

The controlling in the second control mode may involve a phase angle control of the controllable rectifying element. In this control the controllable rectifying element can be controlled to provide a zero crossing of the current at the DC side of the converter. In phase angle control this may be obtained at a phase angle that is approximately ninety degrees. This simplifies the DC circuit breaker design even more.

The switching unit of the first type may be a part of a voltage source converter cell including an energy storage element and a switching unit of a second type and comprising a primary switching element together with an anti-parallel secondary non-controllable rectifying element, wherein the switching units are connected in series with each other and these series connected switching units are connected in parallel with the energy storage element.

BRIEF DESCRIPTION OF THE DRAWINGS

The present invention will in the following be described with reference being made to the accompanying drawings, where FIG. 1 schematically shows a DC power transmission system being connected to AC power lines via four voltage source converters, FIG. 2 schematically shows a voltage source converter of a first type having a number of parallel branches in the form of phase legs each provided with a switching arrangement being controlled by a control unit, FIG. 3 schematically shows a voltage source converter of a second type in which the phase legs are provided with a number of voltage source converter cells, FIG. 4 schematically shows the structure of a first type of voltage source converter cell, FIG. 5 schematically shows the structure of a second type of voltage source converter cell, FIG. 6 schematically shows a number of voltage source converter cells connected along a fault current path between an AC side and a DC side of a cell-based voltage source converter using cells of the second type.

DETAILED DESCRIPTION OF THE INVENTION

In the following, a detailed description of preferred embodiments of the invention will be given.

Figure 1:
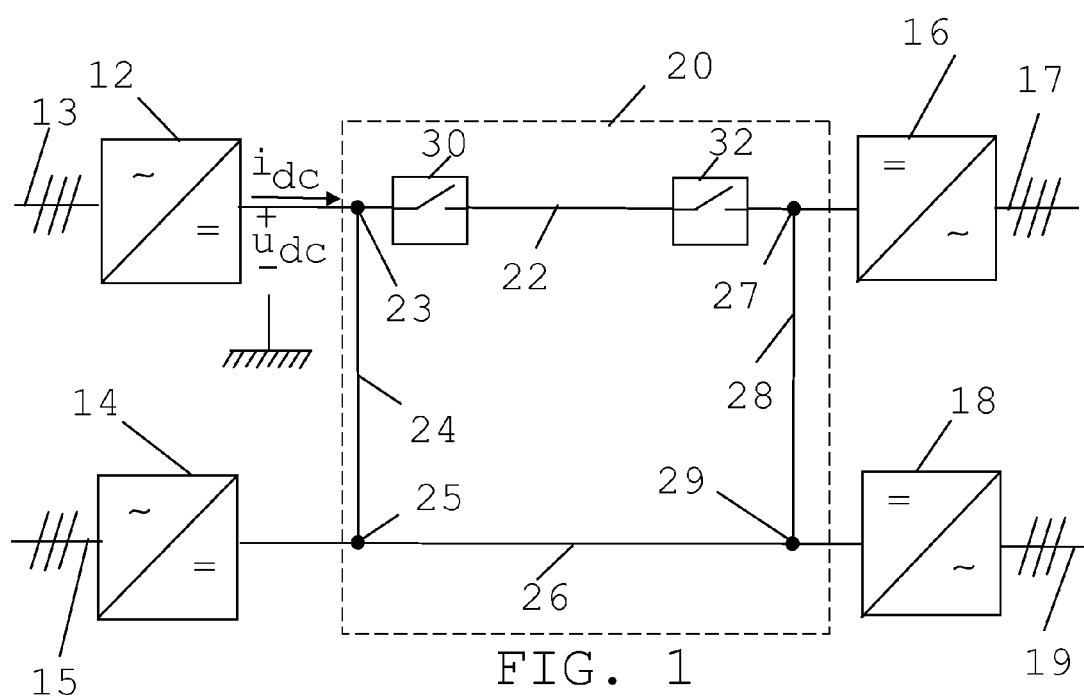

FIG. 1 shows a single line diagram of a simplified Direct Current (DC) power transmission system 20 being connected to four different Alternating Current (AC) power lines via voltage source converters 12, 14, 16 and 18. The power transmission system may with advantage be a High Voltage Direct Current (HVDC) system. There is here a first voltage source converter 12 having an AC side connected to a first AC power line 13 and a DC side connected to a first junction 23 between a first DC power line 22 and a second DC power line 24. There is also a second voltage source converter 14 having an AC side connected to a second AC power line 15 and a DC side connected to second junction 25 between the second DC power line 24 and a third DC power line 26. There is a also a third voltage source converter 16 having an AC side connected to a third AC power line 17 and a DC side connected to a third junction 27 between the first DC power line 22 and a fourth DC power line 28. There is furthermore a fourth voltage source converter 18 having an AC side connected to a fourth AC power line 19 and a DC side connected to a fourth junction 29 between the third DC power line 26 and the fourth DC power line 28. The AC power lines 13, 15, 17 and 19 may here be provided in different AC power transmission and/or distribution systems. The DC power transmission system 20 may also be termed a DC grid. There is furthermore provided a first circuit breaker 30 in the first power line 22 at the first junction 23 and a second circuit breaker 32 also in the first power line 22 at the third junction 27 of the DC power transmission system 20. Finally FIG. 1 shows that the first voltage source converter 12 supplies a DC current $i_{DC}$ and a DC voltage $u_{DC}$ to the DC power transmission network 10. Here the first and second circuit breakers 30 and 32 together with the first second, third and fourth DC power lines 22, 24, 26 and 28 together form the DC power transmission system 20, while the voltage source converters 12, 14, 16, and 18 are interfaces between the AC power transmission lines 13, 15, 17, 19 and the DC power transmission system 20.

It should here be realized that the DC power transmission system can be more complex and include several more DC power lines. It can also include less power lines, for instance one. It should furthermore be realized that there may be several more circuit breakers in the DC system. There are only two in FIG. 1 in order to simplify the description of the present invention. There may also be more or fewer voltage source converters interfacing the DC power transmission system.

Figure 2:
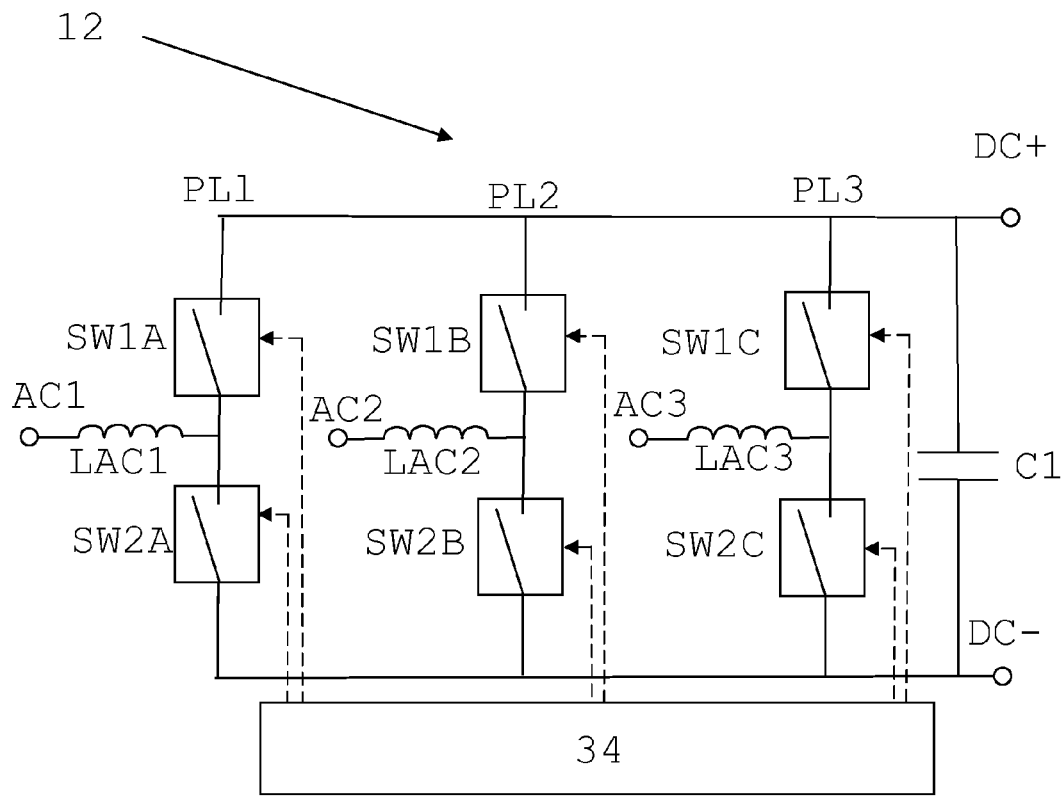

FIG. 2 shows a block schematic outlining an example of a first type of voltage source converter 12. The voltage source converter 12 here includes a group of branches in the form of phase legs connected in parallel between two DC terminals DC+ and DC− for connection to the DC power transmission system. In the example given here there are three such branches or phase legs PL1, PL2, PL3 in order to enable connection to a three-phase AC transmission system. It should however be realized that as an alternative there may be for instance only two phase legs. Each phase leg PL1, PL2, PL3 has a first and second end point. In a converter of the type depicted in FIG. 2 the first end points of all the phase legs PL1, PL2 and PL3 are connected to a first DC terminal DC+ while the second end points are connected to a second DC terminal DC−. Each phase leg includes a lower and upper phase leg half and at the junction where the halves of a leg meet, a three-phase connection point AC1, AC2 and AC3 is provided. Each three-phase connection point AC1, AC2, AC3 is here connected to the corresponding phase leg via a respective inductor LAC1, LAC2, LAC3. Each half includes a switching arrangement SW1A, SW2A, SW1B, SW2B, SW1C, SW2C being controlled by a control unit 34. There is finally a capacitor C1 connected in parallel with the phase legs.

The switching arrangements can each be provided in the form of one or more series connected combinations of primary switching element and anti-parallel secondary rectifying element, where the switching element may as an example be an IGBT transistor. Each such combination of primary switching element and anti-parallel secondary rectifying element is here denoted a switching unit.

The control unit 34 controls the switching elements of the switching arrangements for converting AC power to DC power or vice versa.

The two DC terminals DC+ and DC− here make up the DC side of the voltage source converter 12, while the AC terminals AC1, AC2 and AC3 make up the AC side of the voltage source converter.

The exemplifying converter 12 may here be operated in two power directions. The control typically involves generating control signals by the control unit 34 in known fashion based on PWM modulation, for instance using a triangular saw-tooth wave as a reference signal, and supplying these control signals to the switching arrangements SW1A, SW1B, SW1C, SW2A, SW2B and SW2C. The control unit 34 has further DC fault current limiting functionality, which will be described later on.

The voltage source converter may according to another variation of the present invention be realized in the form of voltage source converter cells being connected to each other in series. This is exemplified by FIG. 3, which shows a second type of voltage source converter 12, where the switching arrangements of each phase leg of the voltage source converter in FIG. 1 has been replaced by a number or a string of voltage source converter cells. The second type of voltage source converter is thus a cell based voltage source converter. It should also be noted that the capacitor between the two DC terminals DC+ and DC− has been removed.

In the present example there are three cells in each phase leg half. Thus the upper half of the first phase leg PL1 includes three cells CA1, CA2 and CA3, while the lower half of the first phase leg PL1 includes three cells CA4, CA5 and CA6. In a similar fashion the upper half of the second phase leg PL2 includes three cells CB1, CB2 and CB3, while the lower half of the second phase leg PL2 includes three cells CB4, CB5 and CB6. Finally the upper half of the third phase leg PL3 includes three cells CC1, CC2 and CC3, while the lower half of the third phase leg PL3 includes three cells CC4, CC5 and CC6. The numbers are here only chosen for exemplifying the principles of the present invention. It is often preferred to have many more cells in each phase leg, especially in HVDC applications.

Figure 4:
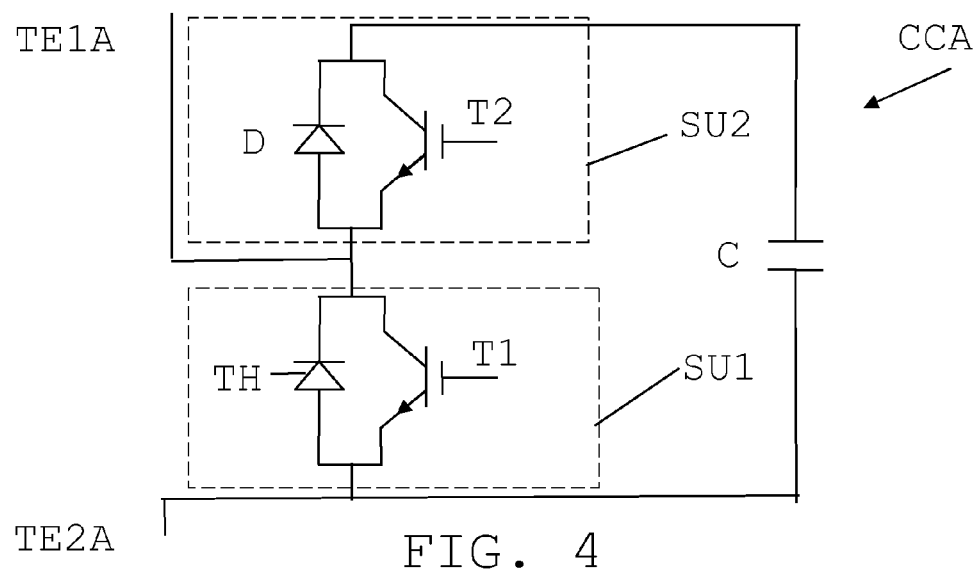

FIG. 4 schematically shows a first type of converter cell CCA that may be used in the voltage source converter of the second type. The cell CCA is a half-bridge converter cell and includes an energy storage element, here in the form of a capacitor C, which is connected in parallel with a first group of switching units. The switching units in the first group are connected in series with each other. The first group here includes a first switching unit SU1 and a second switching unit SU2 (shown as dashed boxes), where each switching unit SU1, SU2 may be realized in the form of a primary switching element that may be an IGBT (Insulated Gate Bipolar Transistor) transistor together with an anti-parallel secondary rectifying element. The first switching unit SU1 is of a first type, where the switching element is a first transistor T and here an IGBT and the rectifying element is a controllable rectifying element and here a thyristor TH. The primary switching element may also have the ability to block a negative voltage. A transistor may thus have the ability to withstand a negative voltage applied between collector and emitter. This may be obtained through providing the transistor with inherent negative voltage blocking capability or through series connection of the transistor with a diode. The second switching unit SU2 is here of a second type where the switching element is of the same type and here a second transistor T2, while the rectifying element is a non-controllable rectifying element and here a diode D. In FIG. 4 the diode D of the second switching unit SU2 is oriented upwards in the figure, which is towards the capacitor C, and connected in parallel between emitter and collector of the second transistor T2. The second switching unit SU2 is connected in series with and followed by the first switching unit SU1 that has the thyristor TH with the same orientation as the diode and connected in parallel with the first transistor T1.

The cell has a first connection terminal TE1A and a second connection terminal TE2A, each providing a connection for the cell to a phase leg of the voltage source converter. In this first type of cell the first connection terminal TE1A more particularly provides a connection from the phase leg to the junction between the first and the second switching unit SU1 and SU2, while the second connection terminal TE2A provides a connection from the phase leg to the junction between the first switching unit SU1 and the capacitor C. These connection terminals TE1A and TE2A thus provide points where the cell can be connected to the phase leg. The connection of the first connection terminal TE1A thus joins the phase leg with the connection point or junction between two of the series connected switching units of the first group, here the first and second switching units SU1 and SU2, while the connection of the second connection terminal TE2A joins the phase leg with a connection point between the first group of series connected switching units and the energy storage element, which is here the connection point between the first switching unit SU1 and the capacitor C.

Through connecting a suitable number of such cells in cascade or series with each other in the phase legs a voltage source converter of the second type is obtained. A phase leg as shown in FIG. 3 may for instance be obtained through connecting a first connection terminal of a first cell to the first DC terminal via an inductor, connecting a first connection terminal of a second cell to the second connection terminal of the first cell, connecting a first connection terminal of a third cell to the second connection terminal of the second cell, connecting a first connection terminal of a fourth cell to the second connection terminal of the third cell, connecting a first connection terminal of a fifth cell to the second connection terminal of the fourth cell, connecting a first connection terminal of a sixth cell to the second connection terminal of the fifth cell and connecting the second terminal of the sixth cell to the second DC terminal via an inductor.

Figure 5:
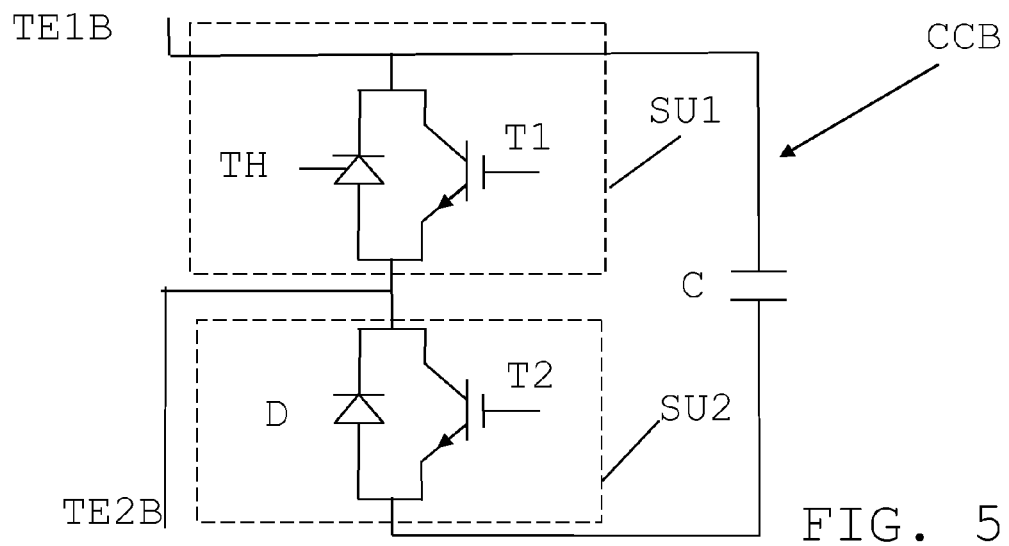

FIG. 5 schematically shows a second type of half-bridge converter cell CCB having the same type of components as the first type and being interconnected in the same way. However, here the first switching unit SU1 is followed by the second switching unit SU2. There is also in this second type of cell CCB a connection terminal TE2B, a second connection terminal, which provides a connection between the branch and the connection point between the first and the second switching units SU1 and SU2 as well as a connection terminal, a first connection terminal TE1B, which provides a connection between the branch and the junction between the first switching unit SU1 and the capacitor C.

Figure 3:
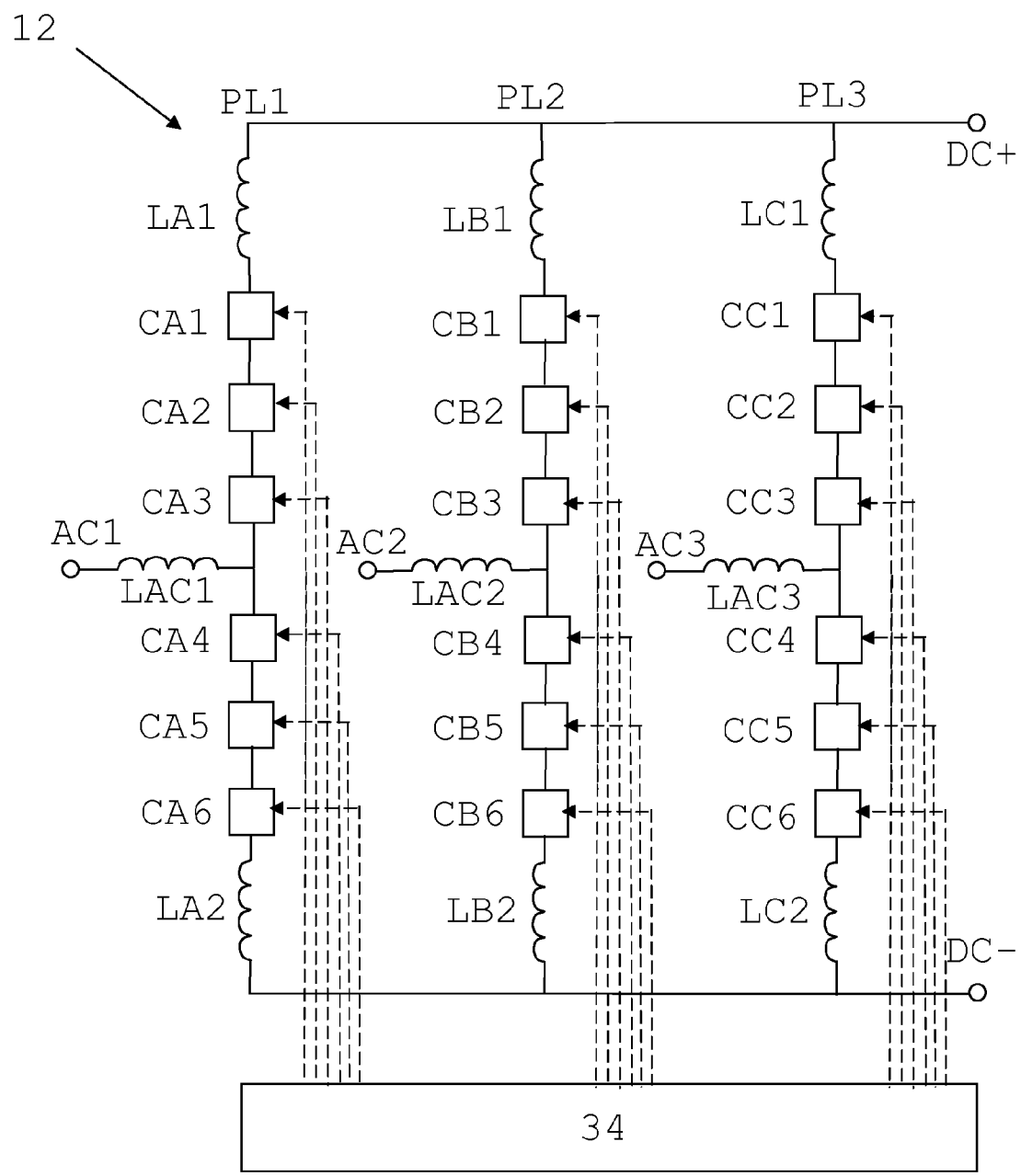

It should here furthermore be realized that it is possible to connect two voltage source converters, of either the first or the second type shown in FIGS. 2 and 3, in pairs between a junction in the DC system and the AC system. The first DC terminal of a first converter of such a converter pair would then be connected to a positive DC potential, while the second DC terminal would be connected to ground. The first DC terminal of the second converter of the converter pair would then be connected to ground, while the second DC terminal would be connected to a negative DC potential.

According to the principles of the present invention, the first type of voltage source converter is provided with switching arrangements, at least in the upper phase leg halves, that are made up of switching units of the first type, while the voltage source converter of the second type includes cells of the first or the second type, at least in the upper phase leg halves, i.e. also includes such switching units of the first type. This means that in both cases the switching units include units were there is a primary switching element together with an anti-parallel secondary controllable element. The voltage source converter according to the invention may be provided in relation to high voltage DC applications where large currents and voltages are used. In HVDC systems it is possible that a fault is created in the DC power transmission system, for instance in the first power line in FIG. 1. Such DC faults are hard to handle in DC power transmission systems. One reason for them being hard to handle is that the currents may become very high in the case of a fault. Another problem is that the system is a DC power transmission system, where the current is a DC current. This makes the breaking of power lines a rather complex affair.

The present invention is directed towards addressing such issues.

The normal way of providing a voltage source converter is to provide all switching units as switching element and non-controllable rectifying element pairs, i.e. as transistor and diode combinations. When this is the case, the current through the voltage source converter will increase when a DC fault occurs and the transistors will be blocked in order to avoid thermal damage. If the phase legs are solely made up of transistor-diode pairs, the converter will behave as a diode bridge i.e. the fault current is uncontrolled (in an active sense).

The idea behind the present invention is to replace non-controllable rectifying elements, i.e. diodes, of switching units appearing in the fault current carrying path with controllable rectifying elements and in this case with thyristors. A fault current path is here the path that the fault current will take through the voltage source converter. There may here be a current delivery section of this path through which current is delivered to the DC power transmission system and a return section through which current is returned. It should here be realized that this replacement may only be performed in the delivery section. However it may be performed also in the return section.

When the voltage source converter is a traditional voltage source converter, such as the converter shown in FIG. 2, this is straightforward and involves replacing all diodes in at least one half of the phase legs with thyristors.

Figure 6:
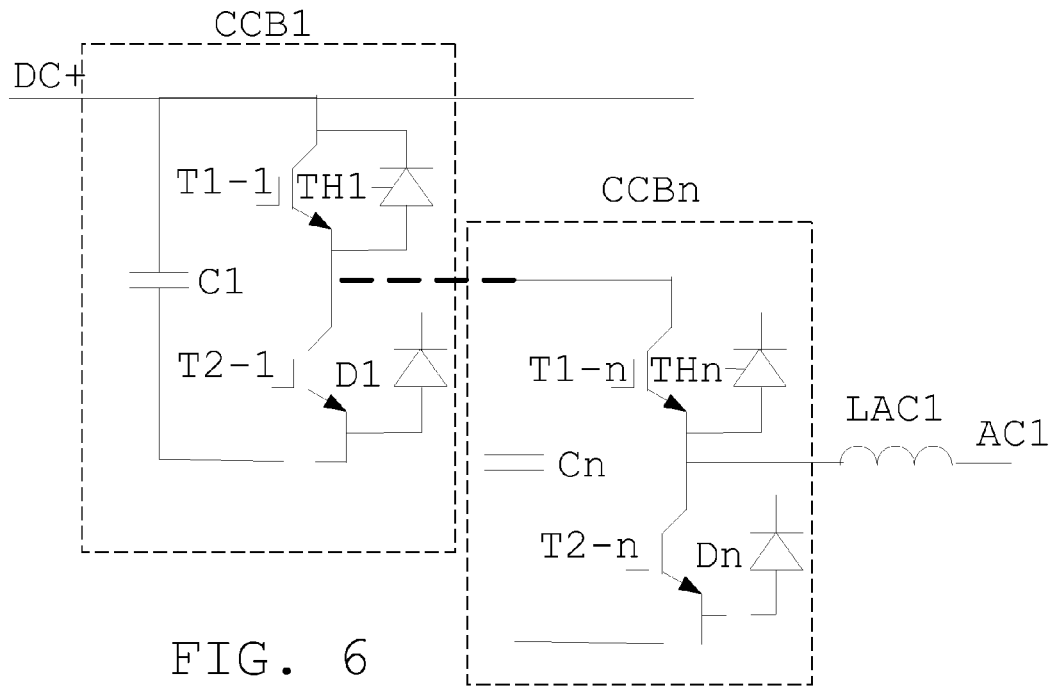

However, when using a cell-based voltage source converter, the fault current will only pass half of the switching units of a cell. This means that the above-mentioned replacement need only be made in this half. This is exemplified in FIG. 6, which schematically shows a first CCB1 and an $n^{th}$ CCBn cell of the second type connected between the positive DC terminal DC+ and the first AC terminal AC1 of the first leg of the voltage source converter of FIG. 3.

It can be seen that if a positive voltage is applied at the first AC terminal AC1, and the transistors T1-$n$, T2-$n$, T1-1, and T2-1 are switched off or blocked, a current will only run through the thyristors THn and TH1.

Figure 7:
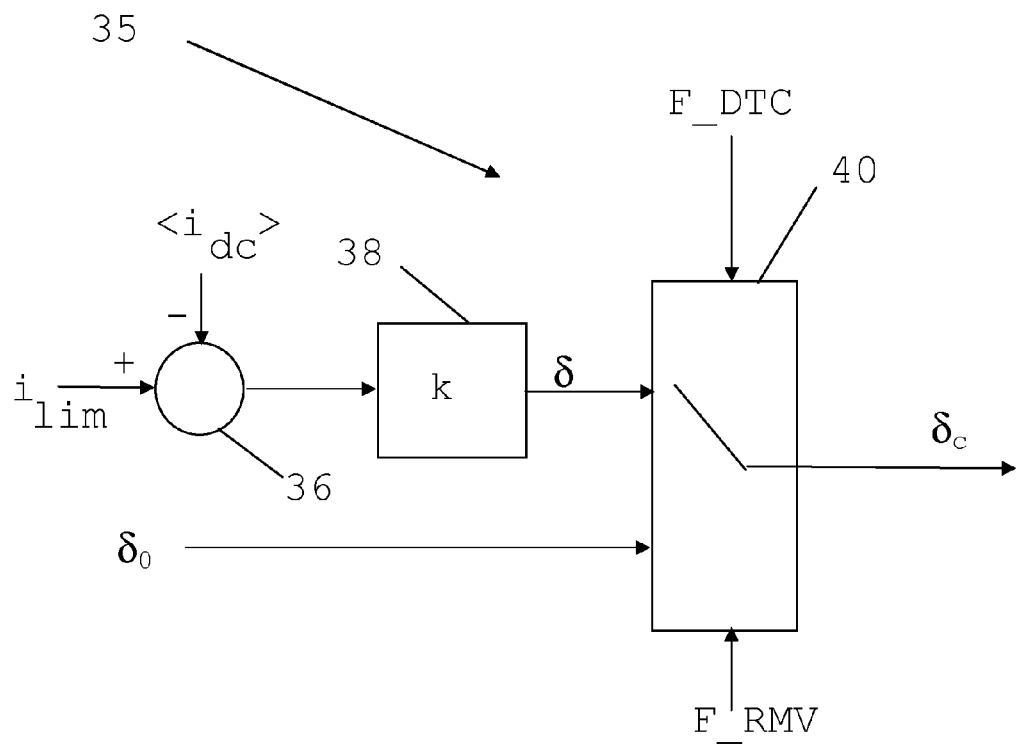
FIG. 7 shows a block schematic outlining a thyristor control section of the control unit, FIG. 8 schematically shows a flow chart including a number of method steps in a method for limiting the current in the DC power transmission system and being performed in a voltage source converter, and FIG. 9 schematically shows the average current and average voltage of the first voltage source converter at the DC side in relation to a fault.

FIG. 7 shows a block schematic of one way of realizing a thyristor control functionality 35 of the control unit. In FIG. 7 there is a first subtracting unit 36, which receives two signals $i_{dc}$ and $i_{lim}$ and supplies the result of a subtracting operation to an amplifying unit 38, which amplifies the difference with a gain k and provides a phase angle δ as output to a switch 40. The switch 40 also receives a zero phase angle $δ_0$ and is switchable between two positions based on two control signals F_DTC representing fault detection and F_RMV representing fault removal. The switch provides as its output a phase angle $δ_c$ that is either of the two phase angles δ or $δ_0$.

Figure 8:
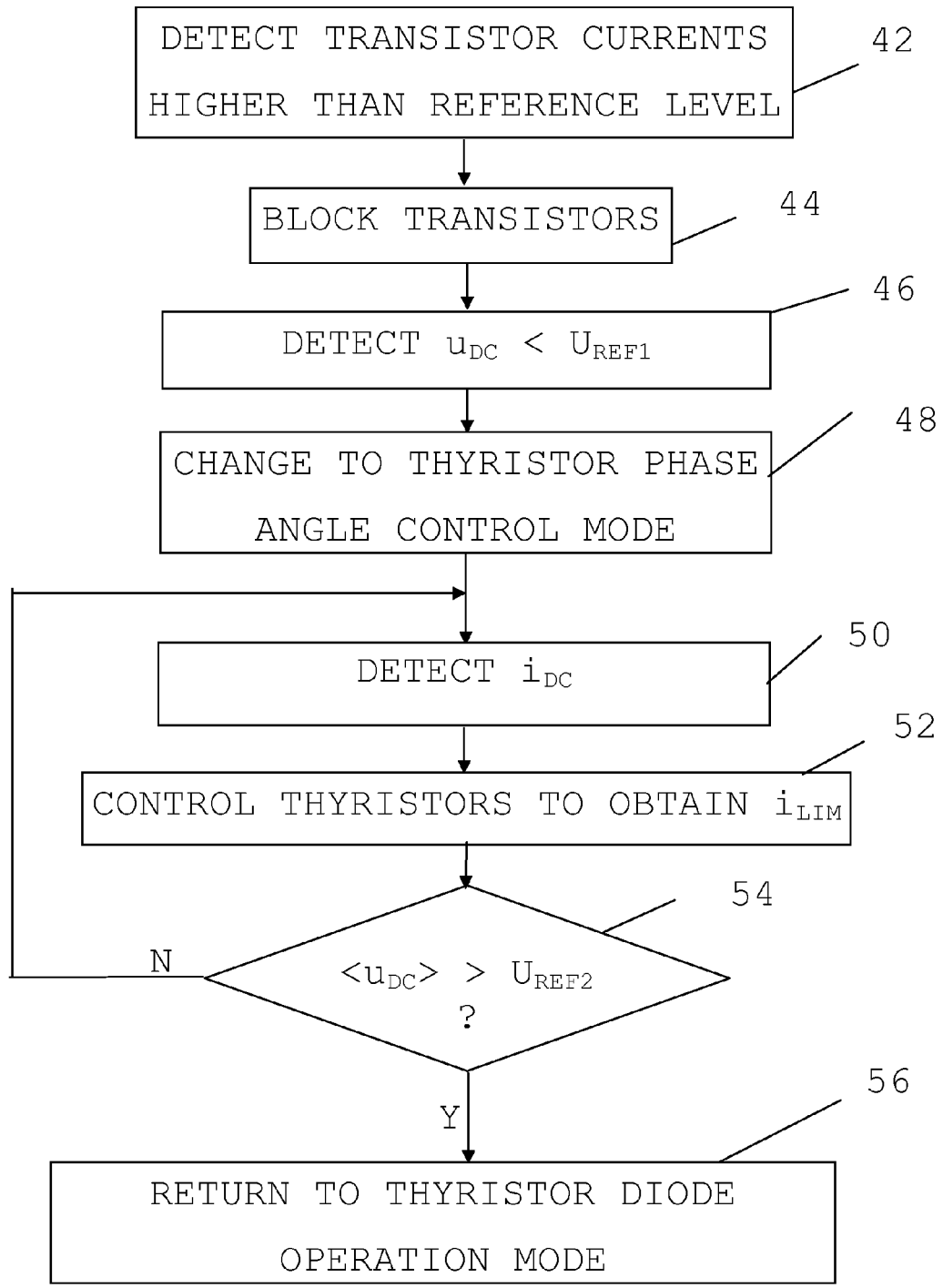
Figure 9:
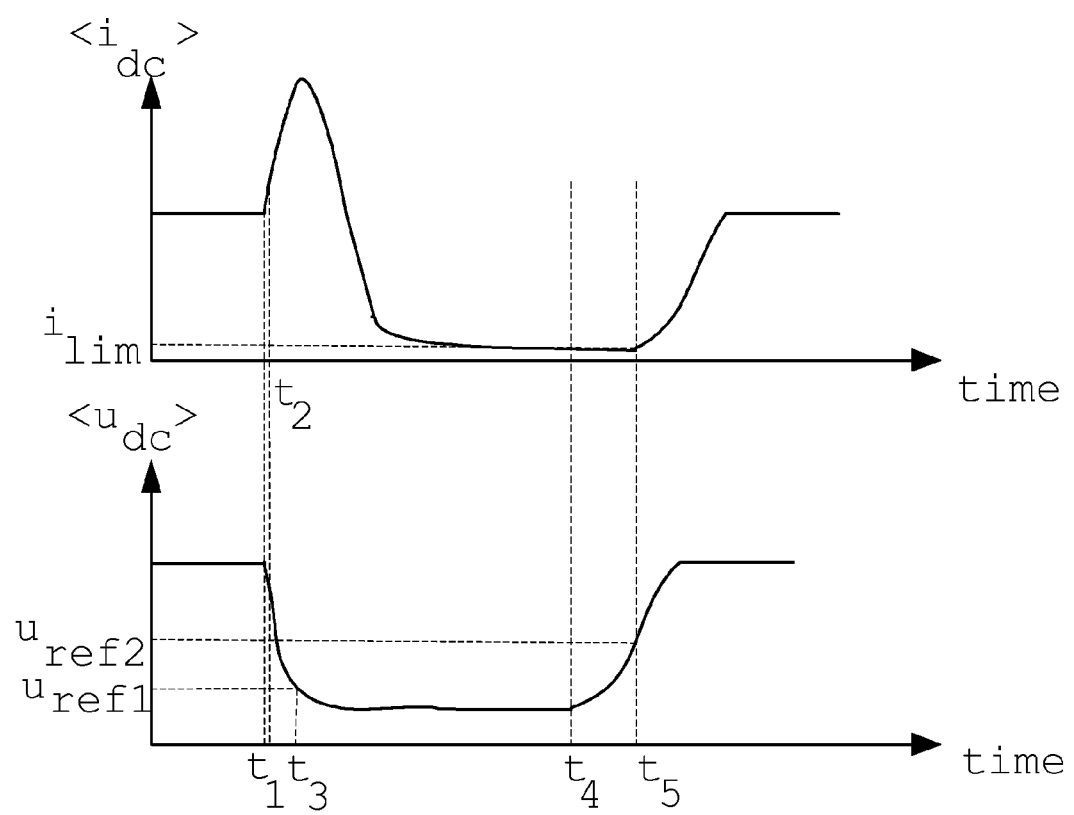

Now the functioning of the present invention as being provided in the first converter 12 will be described in more detail with reference being made to FIGS. 1, 3, 6 and 7 as well as to FIG. 8, which schematically shows a flow chart including a number of method steps in a method for limiting the current in the DC power transmission system and being performed in the first voltage source converter 12, and to FIG. 9, which schematically shows the average current and average voltage of the first voltage source converter at the DC side in relation to a fault in the first power line.

The thyristors TH1 and THn in the converter cell elements CCB of the first converter 12 are in normal operation, i.e. when there is no fault in the DC network 20, operated as diodes. This means that they are controlled by the control unit 34 according to a first control mode so that they will always conduct current as a positive voltage is applied over them. This means that the switch 40 of the thyristor control functionality 35 of the control unit 34 in this mode is set to provide a phase angle $δ_c$ that is a zero phase angle $δ_0$ for firing the thyristors TH1 and THn. In this mode the control unit may send a continuous sequence of gate current pulses, also known as "picket fence", to the thyristors in order to make sure that they turn on whenever they get forward biased. As an alternative it is possible that the control unit instead automatically provides gate drive pulses whenever the thyristors are forward biased. In this way the thyristors provide a current path in the opposite direction of that of the transistors T1-1 and T1-$n$ that act as switches. This means that in this first control mode the first type of switching units are controlled to act as transistors with anti-parallel diodes.

Normal operation is thus provided up till a time $t_1$ at which time a DC fault occurs in the DC grid or DC power transmission system 20. As an example a pole-to-ground fault occurs in the first power line 22. At this point in time $t_1$, DC currents start to increase and DC voltages start to decrease. This means that also the DC current $i_{DC}$ and the DC voltage $v_{DC}$ at the DC side of the first converter 12 change in the same way. As the currents rise, the currents running through the switching elements of the cells may then be higher than a reference level. Therefore there may be a detection that the currents through the transistors are higher than the reference level, step 42, which causes the transistors to be blocked, step 44, which happens at time $t_2$. This may be done in order to protect the transistors from thermal damage. The control unit 34 may thus determine that the current through the transistors are jeopardizing them and therefore block them. However, the current will still continue to rise and the voltage will also continue to fall. Therefore the fault is then detected, which detection may be carried out by the first converter 12 itself or by dedicated fault detection equipment provided in the DC power transmission system 20. This means that the control unit may receive a fault detection indication signal from such equipment or may determine the existence of a fault itself. Detection of a fault can thus be performed in a multitude of ways. It may for instance be carried out through comparing a characteristic of a power component at the DC side of the voltage source converter with a corresponding power component threshold and to determine that there is a fault in case this characteristic of the power component passes this threshold. In one embodiment of the invention, the power component is a voltage and one characteristic of this voltage is the voltage level that is compared with a voltage level threshold. This means that as the voltage level at the DC side of the voltage source converter 12 is decreasing it is possible to detect a fault through detecting that this voltage level, and thus the voltage in the DC network, falls below a first threshold $U_{REF1}$, step 46, which first threshold is thus a first voltage level reference. This crossing of the first threshold is detected at a time $t_3$. This means that the detecting of a fault in this case involves comparing the voltage at the DC side of the converter with a first voltage reference and determining the there is a fault in dependence of if this voltage falls below the first voltage reference. In this case a determination is made that there is a fault if the voltage level falls below this voltage level threshold. Faults may alternatively be detected through sensing another characteristic, the rate of change of the voltage at the DC side of the voltage source converter, comparing this rate of change with a corresponding first rate of change threshold and determining the existence of a fault in case this rate of change is below this first rate of change threshold, which first rate of change threshold is normally negative. This means that a fault would be detected if the rate of change, which is negative, falls below this negative threshold. This means that the absolute value of this rate of change is higher than the absolute value of the threshold. In this way it is possible to detect a fast drop of the voltage. It is also possible to detect a characteristic of another power component, the current, where the characteristic may be the current level. Here it is possible that the current level at the DC side of the voltage source converter is detected, compared with a corresponding current level threshold and the existence of a fault is determined if this current level threshold is exceeded. It is furthermore possible to detect another characteristic of the current at the DC side of the voltage source converter, the rate of change, compare this rate of change with a corresponding rate of change threshold and determine that there is a fault in case this rate of change is above this rate of change threshold, which threshold is normally positive. This means that a fast increase of the current would be detected. It should finally be mentioned that it is also possible with a combination of any of these detection techniques for detecting a fault.

As the fault has been detected, the control unit 34 thereafter changes control mode for the thyristors of the switching units in the fault current path from the first control mode to a second control mode, which is to control these thyristors to act as controllable rectifying elements, i.e. normal thyristor control, or in other words phase angle control. The control unit 34 thus changes control mode from diode to phase angle control, step 48, which is done based on a fault detecting signal F_DTC, which may thus be generated internally in the control unit 34 or a signal received from an entity external to the control unit 34. In the thyristor control functionality 35 of the control unit 34 this signal is supplied to the switch 40, which then changes from supplying the zero phase angle $\delta_0$ as output signal $\delta_c$ to providing a phase angle $\delta$ supplied by the amplifying unit 38 as output signal $\delta_c$. Phase angle control is based on the current $i_{DC}$ at the DC side of the first converter 12 and more particularly on the average current on the DC side. Therefore the current $i_{DC}$ at the DC side of the converter 12 is detected or measured, step 50. The control unit 34 then controls the controllable rectifying elements of the first converter based on the detected current. This involves controlling the thyristors for obtaining a set current limitation value $i_{LIM}$, step 52. This is done through comparing the average measured current $i_{DC}$ with the current limitation value $i_{LIM}$ in the subtracting unit 36 and changing the phase angle based on the difference. It is here for instance possible with P, PI or PID regulation. In FIG. 7 proportional regulation is performed using a gain k in the amplifying unit 58 for obtaining a phase angle $\delta$ that is supplied as output phase angle $\delta_c$ for controlling the thyristors. This means that the thyristors each receive a switching pulse when they are to be turned on according to the phase angle. This control is continued until the fault has been removed. The current level is thus reduced. This would normally lead to the transistors being de-blocked and starting to operate again. However, as there is still a fault, they have to remain blocked. The control unit 34 therefore continues to block all transistors until the fault has been safely removed. This also means that the current is not used for indicating the fault in this second control mode.

The current limit value $i_{LIM}$ can here be set to zero. However it may be desirable to continue to feed some current into the DC power transmission system. It may for instance be necessary to have some current in the DC power transmission system in order to perform selective detection of where in the system the fault is located in order to find out which parts of the DC power transmission system that are faulty and need to be disconnected. It may also be necessary to retain some currents in order to charge cable capacitances once the faulty part is disconnected. The fault current contribution can be substantially lower than the normal load current, since the indication of fault is obtained via the DC voltage. If the total fault current allowed in the DC power transmission system is $I_{LIM}$, which may for instance be 4 kA, then the fault current contribution from the first voltage source converter may be $I_{LIM}/m$, where m is the number of voltage source converters that are interfacing the DC power transmission system. The current limit value $i_{LIM}$ may thus be set according to: $i_{LIM}=I_{LIM}/m$. With four converters the current limit value $i_{LIM}$ would thus be 1 kA.

Thereafter the fault is removed in the system, which is typically done through the first and second circuit breakers 30 and 32 disconnecting the first DC power line 12 from the DC power transmission system 20. This is done at time $t_4$. The removal of the fault may then be detected. This detection may also here be performed in the system outside of the converter or in the converter itself. As the fault is removed the voltage of the DC power transmission system 20 starts to increase. In order to detect this removal, the control unit 34 therefore compares the average voltage $<u_{DC}>$ at the DC side of the first converter 12 with a second voltage reference $U_{REF2}$, step 54, and if this is exceeded, then the control unit 34 determines that the fault has been removed and returns to thyristor diode control mode, i.e. to controlling the thyristors as diodes, step 56, which is done at time $t_5$. The control unit 34 thus resumes control of the controllable rectifying elements in the fault current path according to the first control mode. Then the transistors can also be unblocked and normal operation is thus restored. However if the average voltage did not exceed this second reference voltage $U_{REF2}$, step 54, thyristor control mode is continued, steps 50, 52. A switch back to the first control mode may be done through generating or receiving a control signal F_RMV indicating that the fault has been removed, which signal is supplied to the switch 40, which switches in order to once again supply the zero phase angle $\delta_0$ as output signal for controlling the thyristors.

Alternative ways of detecting removal of the fault may here be provided. Removal of the fault may for instance be detected through sensing the rate of change of the voltage at the DC side of the voltage source converter, comparing this rate of change with a second rate of change threshold and detecting a removal of the fault in case this rate of change is above this second rate of change threshold, which threshold is normally positive. This means that a fast increase of the voltage would be detected. It should finally be mentioned that it is also possible with a combination of these detection techniques for detecting a removal of the fault.

In this way the current is thus reduced, which simplifies removal of the fault. The fault current in the DC power transmission system is thus limited, which simplifies the removal of the fault. This allows a simpler and more economical realization of circuit breakers to be made. As the current limitation is made in the rectifying elements of the voltage source converter, there is no additional current limitation element provided in the DC power transmission system. This allows current limitation to be provided without significantly limiting the efficiency of the DC power transmission system in normal operation. This also provides current limiting functionality without additional elements, but the same voltage source converter elements can be used for voltage conversion and current limitation.

It should here be realized that the time interval $t_4$-$t_3$ should be large enough for allowing safe determination of the location of the fault so that wrong disconnections are not made.

According to variation of the present invention it is possible that the current limitation is set so low that the phase angle will be regulated to approximately ninety degrees and preferably slightly less than ninety degrees. This has the advantage of obtaining a current at the DC side of the converter that has a zero crossing. Because the current at the DC side has a zero-crossing, the circuit breakers in the DC power transmission system can be simplified. Because there are zero-crossings it is possible to use AC circuit breakers that are simpler in structure and often cheaper than regular DC breakers.

There are a number of variations that are possible to make of the present invention. It is possible to use direct control of the controllable rectifying elements to obtain a certain current level on the DC side of the converter instead of the above described control loop based on the detected current at the DC side. It is for instance possible to use a predetermined phase angle in a range of for instance 70-90 degrees. It is also possible to vary the phase angle according to a pre-determined varying scheme, like for instance gradually increasing the phase angle from zero until it reaches a pre-determined end phase-angle for instance in the range of 70-90 degrees. It is also possible to provide a controllable rectifying element also in the return path, i.e. in the lower half of a phase leg. In the case of voltage converter cells, it is possible that all switching units of the cell are switching units of the first type. It is also possible that all switching units are of the first type also in voltage source converters of the first type. In the method described above the step of blocking switching elements was performed before the fault was detected. However, it should be realized that the fault may as an alternative be detected simultaneously or before the switching elements are blocked.

Another possible variation is to use snubbers in order to limit the rate of change of the voltage at turn off as well as reactors for limiting the rate of change of the current at turn on. This may also be combined with a clamping arrangement. Such a snubber may for instance be placed in parallel with the thyristor, while a reactor may be placed in series with it.

The switching units used in the cells have been described as employing transistors. These are with advantage IGBTs. It should be realized that other types of switching elements may be used, such as elements based on thyristors, MOSFET transistors, GTOs (Gate Turn-Off Thyristor) or IGCTs (Integrated Gate Commuted Thyristor). Also the controllable rectifying elements may be provided as GTOs or IGCTs.

The control unit need not be provided as a part of a voltage source converter. It can be provided as a separate device that provides control signals to the voltage source converter. This control unit may be realized in the form of discrete components as indicated in FIG. 7. However, it may also be implemented in the form of a processor with accompanying program memory comprising computer program code that performs the desired control functionality when being run on the processor. This computer program product can be provided as a data carrier such as one or more CD ROM discs or one or more memory sticks carrying computer program code, which performs the above-described current limitation control functionality when being loaded into a control unit of a voltage source converter.

From the foregoing discussion it is evident that the present invention can be varied in a multitude of ways. It shall consequently be realized that the present invention is only to be limited by the following claims.

The invention claimed is:

1. A method for limiting a current in a DC power transmission system using a voltage source converter including a fault current path between an AC side and a DC side of the converter, said fault current path including at least one switching unit of a first type, where each switching unit of the first type includes a primary switching element together with an anti-parallel secondary controllable rectifying element, the method comprising the steps of:
blocking primary switching elements of the converter,
detecting a fault in the DC power system,
changing the control of the controllable rectifying elements in the fault current path from a first control mode to a second control mode, the first control mode being to control the controllable rectifying elements to act as non-controllable rectifying elements so that they will always conduct current as a positive voltage is applied over them and the second control mode being to control the controllable rectifying elements to act as controllable rectifying elements, and
controlling, according to said second control mode, the controllable rectifying elements of the fault current path to limit a current ($i_{DC}$) at the DC side of the converter,
wherein at least one characteristic of at least one power component at the DC side of the voltage source converter is compared with a first threshold level of the at least one characteristic to determine changing the control of the controllable rectifying elements in the fault current path from the first control mode to the second control mode, and is compared with a second threshold level of the at least one characteristic to determine changing the control of the controllable rectifying elements in the fault current path from the second control mode back to the first control mode, and the first threshold level of the at least one characteristic and the second threshold level of the at least one characteristic have different values.

2. The method according to claim 1, further comprising the step of detecting the current ($i_{DC}$) at the DC side of the converter and the step of controlling the controllable rectifying elements of the fault current path comprises controlling the controllable rectifying elements of the fault current path based on this detected current.

3. The method according to claim 1, wherein the step of detecting a fault in the DC power system involves comparing the at least one characteristic of at least one power component at the DC side of the voltage source converter with the first threshold level and determining that there is a fault in case the characteristic of the power component passes the first threshold level.

4. The method according to claim 1, further comprising the step of detecting the removal of the fault and resuming control of the controllable rectifying elements of the fault current path according to the first control mode based on said detection of the removal of the fault.

5. The method according to claim 1, wherein the step of controlling in the second control mode involves controlling the controllable rectifying element for providing a zero crossing of the current at the DC side of the converter.

6. The method according to claim 1, wherein the control according to the second control mode comprises a phase angle control of the controllable rectifying element.

7. The method according to claim 1, wherein each switching unit of the first type is a part of a voltage source converter cell including an energy storage element and a switching unit of a second type and comprising a primary switching element together with an anti-parallel secondary non-controllable rectifying element, wherein the switching units are connected in series with each other and these series connected switching units are connected in parallel with the energy storage element.

8. The method according to claim 2, wherein the step of controlling the controllable rectifying elements comprises controlling the average current ($<i_{DC}>$) at the DC side of the converter to a set current limitation value ($i_{LIM}$).

9. The method according to claim 3, wherein one power component is the voltage ($u_{DC}$), one characteristic is the level of this voltage, the first threshold level is a first voltage level reference ($U_{REF1}$) and the determining that there is a fault is made in dependence of if the voltage falls below the first voltage level reference.

10. The method according to claim 3, wherein one power component is the voltage ($u_{DC}$), one characteristic is the rate of change of this voltage, the first threshold level is a voltage rate of change threshold and the determining that there is a fault is made in dependence of if the rate of change of the voltage falls below the voltage rate of change threshold.

11. The method according to claim 3, wherein one power component is the current ($i_{DC}$), one characteristic is the level of this current, the first threshold level is a current level threshold and the determining that there is a fault is made in dependence of if the current rises above the current level threshold.

12. The method according to claim 3, wherein one power component is the current ($i_{DC}$) one characteristic is the rate of change of this current, the first threshold level is a current rate of change threshold and the determining that there is a fault is made in dependence of if the rate of change of the current rises above the current rate of change threshold.

13. The method according to claim 4, wherein the step of detecting a removal of the fault comprises comparing the average voltage ($<u_{DC}>$) at the DC power side with a second voltage reference ($U_{REF2}$) as the second threshold level and determining that the fault has been removed in case the average voltage rises above the second voltage reference.

14. The method according to claim 6, wherein the phase angle is controlled to approximately ninety degrees.

15. A voltage source converter for limiting a current in a DC power transmission system, being provided with an AC side and a DC side and having a fault current path between said AC side and said DC side, said voltage source converter comprising:
at least one switching unit of a first type provided in said fault current path, where each switching unit of the first type includes a primary switching element together with an anti-parallel secondary controllable rectifying element, and
a control unit configured to, based on a fault being detected in the DC power system when the primary switching elements of the converter are blocked,
change the control of said controllable rectifying elements from a first control mode to a second control mode, the first control mode being to control the controllable rectifying elements to act as non-controllable rectifying elements so that they will always conduct current as a positive voltage is applied over them and the second control mode being to control the controllable rectifying elements to act as controllable rectifying elements, and
control, according to said second control mode, the controllable rectifying elements of the fault current path to limit a current ($i_{DC}$) at the DC side of the converter,
wherein the control unit is further configured to compare at least one characteristic of at least one power component at the DC side of the voltage source converter with a first threshold level of the at least one characteristic to determine changing the control of the controllable rectifying elements in the fault current path from the first control mode to the second control mode, and with a second threshold level of the at least one characteristic to determine changing the control of the controllable rectifying elements in the fault current path from the second control mode back to the first control mode, and the first threshold level of the at least one characteristic and the second threshold level of the at least one characteristic have different values.

16. The voltage source converter according to claim 15, wherein the control unit when controlling the controllable rectifying elements of the fault current path is further configured to control the controllable rectifying elements based on the detected current ($i_{DC}$) at the DC side of the converter.

17. The voltage source converter according to claim 15, wherein the control unit, when detecting a fault in the DC power system, is configured to compare the at least one characteristic of the at least one power component at the DC side of the voltage source converter with the first threshold level and determine that there is a fault in case the characteristic of the power component passes the first threshold level.

18. The voltage source converter according to claim 15, wherein the control unit is further configured to detect the removal of the fault and resume control of the controllable rectifying elements of the fault current path according to the first control mode based on said detection (F_RMV) of the removal of the fault.

19. The voltage source converter according to claim 15, wherein the control unit when controlling in the second control mode is configured to control the controllable rectifying element for providing a zero crossing of the current at the DC side of the converter.

20. The voltage source converter according to claim 15, wherein the control unit when controlling according to the second control mode is configured to perform phase angle control of the controllable rectifying element.

21. The voltage source converter according to claim 15, wherein each switching unit of the first type is a part of a voltage source converter cell including an energy storage element and a switching unit of a second type and comprising a primary switching element together with an anti-parallel secondary non-controllable rectifying element, wherein the switching units are connected in series with each other and these series connected switching units are connected in parallel with the energy storage element.

22. The voltage source converter according to claim 16, wherein the control unit when being configured to control the rectifying elements of the fault current path based on the detected current ($i_{DC}$) at the DC side of the converter is configured to control the average current ($<i_{DC}>$) at the DC side of the converter to a set current limitation value ($i_{LIM}$).

23. The voltage source converter according to claim 17, wherein one power component is the voltage ($u_{DC}$), one characteristic is the level of this voltage, the first threshold level is a first voltage level reference ($U_{REF1}$) and the control unit, when detecting a fault in the DC power system, is configured to determine that there is a fault in dependence of if the voltage falls below the first voltage level reference.

24. The voltage source converter according to claim 17, wherein one power component is the voltage ($u_{DC}$), one characteristic is the rate of change of this voltage, the first threshold level is a voltage rate of change threshold and the control unit, when detecting a fault in the DC power system, is configured to determine that there is a fault in dependence of if the rate of change of the voltage falls below the voltage rate of change threshold.

25. The voltage source converter according to claim 17, wherein one power component is the current ($i_{DC}$), one characteristic is the level of this current, the first threshold level is a current level threshold and the control unit, when detecting a fault in the DC power system, is configured to determine that there is a fault in dependence of if the current rises above the current level threshold.

26. The voltage source converter according to claim 17, wherein one power component is the current ($i_{DC}$), one characteristic is the rate of change of this current, the first threshold level is a current rate of change threshold and the control unit, when detecting a fault in the DC power system, is configured to determine that there is a fault in dependence of if the rate of change of the current rises above the current rate of change threshold.

27. The voltage source converter according to claim 18, wherein the control unit when being configured to detect a removal of the fault is configured to compare the average voltage ($<u_{DC}>$) at the DC power side with a second voltage reference ($U_{REF2}$) as the second threshold level and determine that the fault has been removed in case the average voltage rises above the second voltage reference.

28. The voltage source converter according to claim 20, wherein the phase angle is controlled to approximately ninety degrees.

29. A computer program product embodied on a non-transitory computer readable medium for limiting a current in a DC power transmission system using a voltage source converter including a fault current path between an AC side and a DC side of the converter, said fault current path including at least one switching unit of a first type, where each switching unit of the first type includes a primary switching element together with an anti-parallel secondary controllable rectifying element, the computer program being loadable into a control unit of the voltage source converter and comprising computer program code configured to make the control unit, when said program is loaded in said control unit, change, based on a fault being detected in the DC power transmission system when the primary switching elements of the converter are blocked, the control of said controllable rectifying elements from a first control mode to a second control mode, the first control mode being to control the controllable rectifying elements to act as non-controllable rectifying elements so that they will always conduct current as a positive voltage is applied over them and the second control mode being to control the controllable rectifying elements to act as controllable rectifying elements, and control, according to said second control mode, the controllable rectifying elements of the fault current path to limit a current ($i_{DC}$) at the DC side of the converter, wherein at least one characteristic of at least one power component at the DC side of the voltage source converter is compared with a first threshold level of the at least one characteristic to determine changing the control of the controllable rectifying elements in the fault current path from the first control mode to the second control mode, and is compared with a second threshold level of the at least one characteristic to determine changing the control of the controllable rectifying elements in the fault current path from the second control mode back to the first control mode, and the first threshold level of the at least one characteristic and the second threshold level of the at least one characteristic have different values.

* * * * *